July 1, 1947. D. P. GRIFFIN 2,423,311
GUARD RAIL FOR BABY CARRIAGES
Filed Dec. 19, 1944
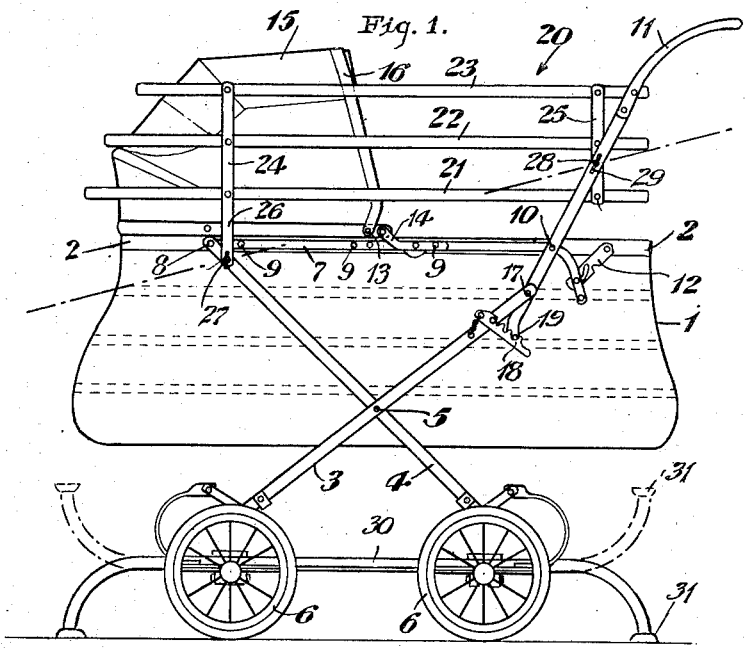
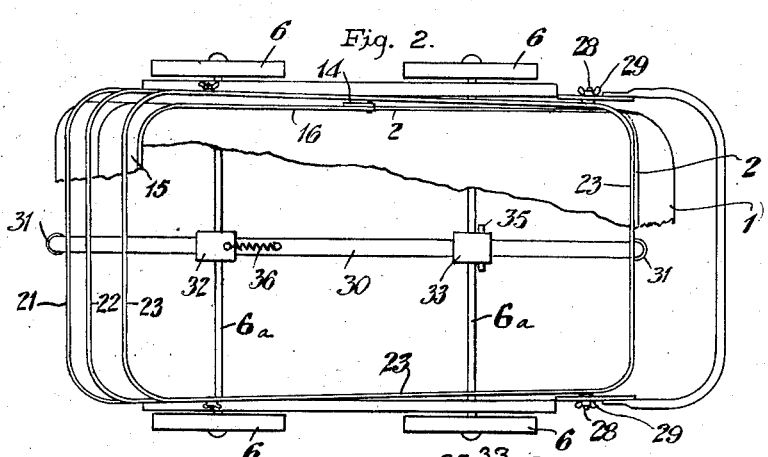
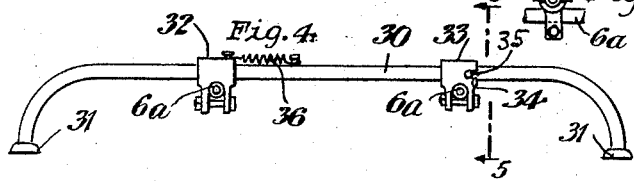
Inventor
DANIEL P. GRIFFIN
per
His Attorneys Patented July 1, 1947

2,423,311

UNITED STATES PATENT OFFICE 2,423,311

GUARD RAIL FOR BABY CARRIAGES

Daniel P. Griffin, Butte, Mont.

Application December 19, 1944, Serial No. 568,811

2 Claims. (Cl. 296—36)

This invention relates to safety devices for baby carriages, and more particularly to an improved guard structure to prevent the child from falling out of the carriage, after the child has developed to the point where it can stand on its feet in the carriage.

The ordinary baby carriage is safely useful only for about the first six months of the child's life; it therefore has a limited use and is comparatively expensive. It is the purpose of this invention to provide a guard structure which can be applied to existing baby carriages, or which can be supplied as a part of the original structure of the baby carriage, and which will substantially increase the period during which the baby carriage can safely be used.

After a child is approximately six months old, depending on the rate of its development, it is customary to provide a crib for the child to sleep in, and a go-cart or push-cart, etc., may be used for its transportation, or the child may be placed in a "walker" for its self-amusement. The difficulty with such devices is, however, that if the child becomes tired it has no place to rest. Accordingly, another object of the present invention is to provide a safety device for a baby carriage which will enable it to be used in place of all such devices. It provides an excellent bed for sleeping as well as a place in which the child may play or amuse itself, in addition to being a convenient means of transportation.

A further object of the invention is to provide a safety device of the class described which is foldable or collapsible so as to occupy a minimum amount of space when not in use and which adapts itself for association with a baby carriage of the collapsible or foldable type.

When a baby carriage is provided with a safety device of the present invention and if used in place of a crib, it is important that the position of the carriage be fixed so that it cannot be easily rolled or pushed about by its occupant or otherwise. It is also important to prevent the carriage from tipping over when its occupant is standing or jumping up and down at either of the extreme ends of the carriage. Accordingly, the invention also aims to provide a mechanism to prevent such tipping and moving of the carriage.

The present invention has been illustrated by way of example as embodied in the foldable or collapsible type of carriage shown in the accompanying drawings. In these drawings—

Fig. 1 is a view in side elevation of the baby carriage incorporating the improvements of the present invention;

Fig. 2 is a plan view of the baby carriage showing the top folded down;

Fig. 3 is a view of the upper portion of the carriage shown in Fig. 1 in folded position;

Fig. 4 is a detailed view showing the carriage tip-over-preventing mechanism; and Fig. 5 is a fragmentary sectional view taken on line 5—5 of Fig. 4.

Referring now to these drawings, the baby carriage has a body 1, preferably of flexible sheet material, such as leather or fabric, so that the body will readily collapse when the carriage is folded for carrying by hand, this material being supported from a metal frame member 2 which extends substantially around the top of the body. The body 1 is supported upon any suitable wheeled frame such, for example, as the collapsible frame shown in Fig. 1. This frame comprises, on each side of the carriage, two diagonal members 3 and 4 pivoted centrally at 5 to form an X-shaped frame, at the lower portion of which the wheels 6 and their supporting axles 6a are attached. A horizontal side bar 7 is pivoted at 8 to the upper end of X member 4 on each side of the carriage. The carriage body 1 is supported between these two side bars 7, frame member 2 of the body being riveted thereto as indicated at 9.

Near the opposite end of side bars 7 there is a pivotal connection 10 with the operating handle 11 of the carriage. Handle 11 below pivot 10 is also pivotally connected at 17 to the upper end of X member 3. At the lower end of handle 11 a short distance below pivotal connection 17 there is a laterally projecting pin or post 19 which is adapted to engage any of a series of notches in a latch member 18 which is pivoted to X member 3, and which is biased into engagement with pin 19 by means of a coil spring. By means of this latching mechanism the X-shaped frame of the carriage is locked in the open or operating position shown in Fig. 1; also handle 11 may be adjusted to different heights. A second latch member 12 pivoted to frame member 2 has no connection with the present invention but is for the purpose of adjustably supporting the right-hand portion of frame member 2 on bar 7 so that it may be lowered slightly to provide a slope which is more comfortable for a sitting child.

The carriage is provided with a top 15 having a frame member 16 which is pivoted at 13 at its lower end to a horizontal member which in turn is secured to a lug 14 fixed to frame member 2.

By swinging member 16 downwardly to the left, the top may be folded or collapsed when desired, in which event the member 16 will occupy about the position shown in Fig. 2.

The foldable guard structure of the present invention indicated generally by numeral 20 is provided at the top of the carriage body 1. This structure comprises a number of guard rails 21, 22 and 23. Although three of these guard rails are shown in the drawing it will be understood that any desired number can be used. Guard rails 21, 22 and 23 are pivoted, preferably in equally spaced relation, near their left-hand ends on each side to a pair of upwardly extending cross bars 24. At their right-hand ends these guard rails are pivoted to a pair of upwardly extending cross-bars 25, the arrangement being such that the guard rails are held in parallel relationship. Supporting cross-bars 24 are each provided with an extension 26 which projects a substantial distance below the lowermost guard rail 21 and which is pivotally fixed near the upper end of diagonal frame member 4 at 27.

At its right-hand end the guard structure 20 is arranged to be connected to and disconnected from the sides of the carriage handle 11, the points of such connection, however, being so located that the plane passing through these points and the pivotal connections 27 intersects the parallel planes of the guard rails 21, 22 and 23 as indicated by the inclined dotted line in Fig. 1. This connection may be made by means of threaded posts 28 welded or otherwise fixed to the outside surfaces of cross-bars 25, these posts projecting through apertures in the sides of handle 11 and being adapted to receive thumb nuts 29 to complete the connection.

Each of the guard rails 21, 22 and 23 extends continuously around the upper periphery of the carriage body 1 and is made of rigid material such as metal, and when the rails are supported by the cross-bars 24 and 25 and these cross-bars are in turn supported by connections to the carriage structure which are disposed in a common plane which intersects the planes of the cross-bars, an exceedingly rigid, sturdy and safe guard structure for the child is provided.

In order to fold the guard structure 20, the two nuts 29 are removed, posts 28 slipped out of the apertures in handle 11, and the nuts replaced on the posts. The left-hand end of the guard structure 20 may then be swung as an entirety upwardly towards the left, the structure turning about the fixed pivots 27. Handle 11 can then be swung, after operating its releasing mechanism, to its folded position substantially parallel with the top of the carriage body. After this the guard structure 20 can be lowered on top of the handle and then shifted to collapsed position by pressure towards the left on the upper part of the structure. If desired, however, the guard structure may be folded before the handle 11 is swung beneath it, that is, the handle 11 may be folded on top of the guard structure instead of below it. The guard rails 21, 22 and 23 extend entirely around the periphery of the baby carriage so as to give strength and rigidity to the structure. Also they do not interfere with the raising and lowering of the top 15.

If a child is playing in the baby carriage there is a possibility—even a probability—of its jumping up and down near one end of the carriage which, it will be seen, overhangs the axles of the wheels 6. In order to stabilize the carriage and prevent its being upset or tipped over, and also to prevent movement of the carriage if it should be standing on a down grade, the locking bar (see Fig. 4) is provided. This bar has curved portions at each end terminating in feet 31 and is mounted for both rotational and limited sliding movement in brackets 32 and 33 which are clamped to the wheel axles 6a.

Bracket 33 is notched on one side as indicated at 34, and a pin 35, which is fixed to the locking bar 30, is adapted to be received in this notch to hold the feet 31 in either the downward position shown in Fig. 4, and in full lines in Fig. 1, or the upward position shown in dotted lines in Fig. 1. A spring 36 biases locking bar 30 towards the left, thereby urging pin 35 into notch 34. This device may be operated with the foot, first to release pin 35 from the notch and then turned in either the upward or downward direction.

By means of the present invention the period of usefulness of a baby carriage in relation to the period of development of a child has been extended substantially; in fact it has been approximately quadrupled, since the ordinary baby carriage can be used for only about six months while a baby carriage embodying the improvements of this invention may be used in the neighborhood of twenty-four months.

While the invention has been illustrated in connection with one particular embodiment thereof it will be understood that changes may be made without departing from the spirit or scope of the invention which is indicated in the appended claims.

I claim:

1. A safety device for baby carriages which have a body and a wheeled frame comprising a foldable guard structure to increase the height of the body walls having a plurality of guard rails extending around the periphery of the carriage body, two pairs of parallel upwardly directed cross-bars pivotally interconnecting the sides of said rail members near the ends of the foldable guard structure, the pair of cross-bars at one end of the guard structure having extensions below the rail members and fixed pivotally to the carriage structure, and means at the opposite end of said guard structure for connecting it to and disconnecting it from the carriage structure; said fixed pivots and said connecting and disconnecting means being disposed in a common plane which intersects the planes of said guard members thereby, when said means is connected, causing the foldable guard structure to be supported in open position with the rail members thereof vertically spaced from each other in substantially parallel relation, said means when disconnected freeing said end of the guard structure from the carriage structure and allowing the guard structure to be shifted lengthwise causing the guard members to fold into contact with each other.

2. A safety device for baby carriages which have a body and a wheeled frame and handle comprising a foldable guard structure to increase the height of the body walls having a plurality of guard rails extending around the periphery of the carriage body, two pairs of parallel upwardly directed cross-bars pivotally interconnecting the sides of said rail members near the ends of the foldable guard structure, the pair of cross-bars at one end of the guard structure having extensions below the rail members and fixedly pivotally to said frame, and means at the opposite end of said guard structure for connecting it to and disconnecting it from said handle at a point above said body serving when connected to hold the foldable guard structure in open position with the rail members thereof vertically spaced from each other in substantially parallel relation, said means when disconnected freeing said end of the guard structure from the handle structure and allowing the guard structure to be shifted lengthwise causing the guard members to fold into contact with each other.

DANIEL P. GRIFFIN.

REFERENCES CITED

The following references are of record in the file of this patent:

UNITED STATES PATENTS

| Number | Name | Date |
|---|---|---|
| 1,781,208 | Youngblood | Nov. 11, 1930 |
| 2,014,085 | Kroll et al. | Sept. 10, 1935 |
| 2,058,205 | Bandura | Oct. 20, 1936 |

FOREIGN PATENTS

| Number | Country | Date |
|---|---|---|
| 7,665 | Great Britain | 1887 |
| 135,176 | Germany | Oct. 22, 1902 |
| 198,976 | Germany | June 2, 1908 |
| 64,812 | Switzerland | Dec. 11, 1913 |

Certificate of Correction

Patent No. 2,423,311.                                                                July 1, 1947.

DANIEL P. GRIFFIN

It is hereby certified that error appears in the printed specification of the above numbered patent requiring correction as follows: Column 4, line 71, claim 2, for "fixedly" read *fixed*; and that the said Letters Patent should be read with this correction therein that the same may conform to the record of the case in the Patent Office.

Signed and sealed this 26th day of August, A. D. 1947.

[SEAL]

LESLIE FRAZER,
*First Assistant Commissioner of Patents.*